US009634350B2

(12) United States Patent
Hwang et al.

(10) Patent No.: US 9,634,350 B2
(45) Date of Patent: Apr. 25, 2017

(54) ENERGY STORAGE DEVICE

(71) Applicant: National Taiwan University of Science and Technology, Taipei (TW)

(72) Inventors: Bing-Joe Hwang, Taipei (TW); Wei-Nien Su, Taipei (TW); Ming-Yao Cheng, Taipei (TW)

(73) Assignee: NATIONAL TAIWAN UNIVERSITY OF SCIENCE AND TECHNOLOGY (TW)

( * ) Notice: Subject to any disclaimer, the term of this patent is extended or adjusted under 35 U.S.C. 154(b) by 245 days.

(21) Appl. No.: 14/333,982

(22) Filed: Jul. 17, 2014

(65) Prior Publication Data

US 2015/0288025 A1 Oct. 8, 2015

(30) Foreign Application Priority Data

Apr. 7, 2014 (TW) .............................. 103112753 A

(51) Int. Cl.
*H01M 10/615* (2014.01)
*H01M 10/637* (2014.01)
(Continued)

(52) U.S. Cl.
CPC ..... *H01M 10/0445* (2013.01); *H01M 10/425* (2013.01); *H01M 10/615* (2015.04);
(Continued)

(58) Field of Classification Search
CPC ........... H01M 10/0445; H01M 10/425; H01M 10/637; H01M 10/615; H01M 16/00; H01M 2200/105
See application file for complete search history.

(56) References Cited

U.S. PATENT DOCUMENTS 8,519,666 B2   8/2013  Terao et al.
2010/0244772 A1*  9/2010  Chan .................... H01M 2/204
                                                    320/137
(Continued)

FOREIGN PATENT DOCUMENTS

TW        M354187        4/2009
TW        I341067        4/2011
(Continued)

OTHER PUBLICATIONS

English language Abstract of Tw M354187.
(Continued)

*Primary Examiner* — Barbara Gilliam
*Assistant Examiner* — Angela Martin
(74) *Attorney, Agent, or Firm* — Hershkovitz & Associates, PLLC; Abe Hershkovitz

(57) ABSTRACT

An energy storage device is provided. The energy storage device includes at least an energy-type electrode pair, including a first positive electrode; a first negative electrode disposed opposite to the first positive electrode; and a first electrolyte disposed between the first positive electrode and the first negative electrode; at least a power-type electrode pair, including a second positive electrode; a second negative electrode disposed opposite to the second positive electrode; and a second electrolyte disposed between the second positive electrode and the second negative electrode; and a housing receiving the energy-type electrode pair and the power-type electrode pair.

14 Claims, 8 Drawing Sheets

(51) Int. Cl.
*H01M 16/00* (2006.01)
*H01M 10/04* (2006.01)
*H01M 10/42* (2006.01)

(52) U.S. Cl.
CPC ......... *H01M 10/637* (2015.04); *H01M 16/00* (2013.01); *H01M 2200/106* (2013.01)

(56) References Cited

U.S. PATENT DOCUMENTS

2011/0117463 A1* 5/2011 Lienkamp ......... H01M 10/0525
429/433
2013/0264875 A1 10/2013 Kaminsky et al.
2015/0280185 A1* 10/2015 Lampe-Onnerud . H01M 2/1077
429/9

FOREIGN PATENT DOCUMENTS

| TW | I344231 | 6/2011 | |
|----|---------|--------|---|
| TW | I358182 | 2/2012 | |
| WO | WO 2013/138380 A2 * | 9/2013 | ............ H01M 16/00 |

OTHER PUBLICATIONS

English language Abstract of TW I358182.
Office Action issued on Mar. 4, 2015 in the counterpart TW Patent Application No. 103112753.

* cited by examiner

ENERGY STORAGE DEVICE

CROSS-REFERENCE TO RELATED APPLICATION AND CLAIM OF PRIORITY

The application claims the benefit of Taiwan Patent Application No. 103112753, filed on Apr. 7, 2014, in the Taiwan Intellectual Property Office, the disclosures of which are incorporated herein in their entirety by reference.

FIELD OF THE INVENTION

The present invention relates to an energy storage device, and more particularly to an energy storage device simultaneously having an energy-type electrode pair and a power-type electrode pair, and capable of being operated at the low temperature.

BACKGROUND OF THE INVENTION

Common rechargeable batteries, e.g. the lithium ion battery, can be divided into the energy-type battery and the power-type battery according to their charge and discharge characteristics. The storage energy of the energy-type battery is high, but the power thereof during charge and discharge is low. On the contrary, the storage energy of the power-type battery is low, but the power thereof during charge and discharge is high. Therefore, the two batteries can be used for different purposes according to their characteristics. For example, the energy-type batteries are more suitable for the products requiring longer runtime or energy density, e.g. the cellphone, notebook computer, etc., whereas the power-type battery can be used for the products requiring higher output power or power density, e.g. the electric car, etc.

However, under the low temperature environment (i.e. lower than the normal working temperature of the battery), both the energy-type battery and the power-type battery have a low battery activity. Therefore, when the battery is used under the low temperature environment, the issues of short power supplying time, poor charge/discharge efficiency and easy damage to the battery will occur.

In order to overcome the drawbacks in the prior art, an energy storage device is provided. The particular design in the present invention not only solves the problems described above, but also is easy to be implemented. Thus, the present invention has the utility for the industry.

SUMMARY OF THE INVENTION

In accordance with an aspect of the present invention, an energy storage device is provided. The energy storage device includes at least an energy-type electrode pair, including a first positive electrode; a first negative electrode disposed opposite to the first positive electrode; and a first electrolyte disposed between the first positive electrode and the first negative electrode; at least a power-type electrode pair, including a second positive electrode; a second negative electrode disposed opposite to the second positive electrode; and a second electrolyte disposed between the second positive electrode and the second negative electrode; and a housing receiving the energy-type electrode pair and the power-type electrode pair.

In accordance with another aspect of the present invention, an energy storage device is provided. The energy storage device includes at least an energy-type electrode pair; at least a power-type electrode pair in thermal contact with the energy-type electrode pair; and a control module controlling the energy-type electrode pair and the power-type electrode pair to be operated independently or in parallel via a circuit.

In accordance with a further aspect of the present invention, an energy storage device is provided. The energy storage device includes an electrode pair; and a positive temperature coefficient thermistor in thermal contact with the electrode pair, having a first positive temperature coefficient under a specific temperature, and having a second positive temperature coefficient above the specific temperature, wherein the first positive temperature coefficient is smaller than the second positive temperature coefficient.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
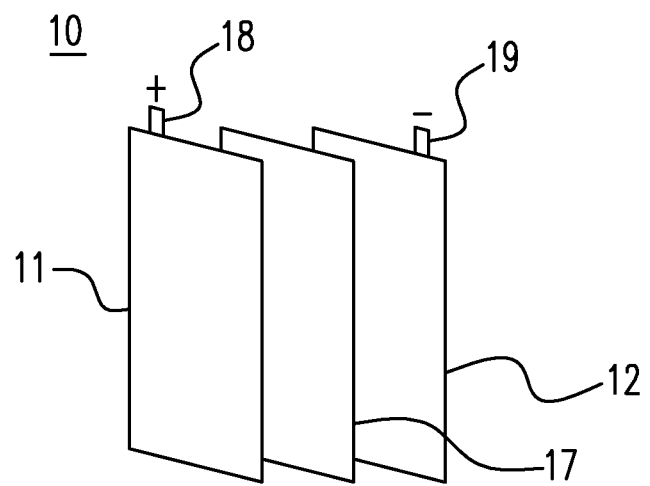
FIG. 1 shows an energy-type electrode pair according to an embodiment of the present invention.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention uses a power-type electrode pair and an energy-type electrode pair. A first electrolyte is disposed between a first positive electrode and a first negative electrode to form the power-type electrode pair. A second electrolyte is disposed between a second positive electrode and a second negative electrode to form the energy-type electrode pair. In addition, the positive electrode terminal and the negative electrode terminal of the power-type electrode pair are different from those of the energy-type electrode pair. Therefore, the power-type electrode pair or the energy-type electrode pair can be independently operated to form an energy storage device that can perform the charge and discharge with different currents at different time. Because the energy storage device is composed of two electrode pairs, the energy-type electrode pair and the power-type electrode pair, it can also be referred to as a dual-module energy storage device. In the present invention, the power-type electrode pair can also be used to serve as a heating source. When the energy storage device is used under a low temperature environment, the power-type electrode pair is used to perform the charge and discharge first. Because the power-type electrode pair is suitable for rapid charge and discharge, it acts first. Moreover, the energy storage device can be connected to the charger or the discharge load circuit via an external system which has a proper circuit design. When the power-type electrode pair acts, it generates heat due to the charge and discharge. This raises the temperature of the energy-type electrode pair. When the energy storage device reaches a suitable operating temperature, the energy-type electrode pair begins to perform the charge and discharge. In this way, the life of the energy-type electrode pair is prolonged.

The present invention provides an energy storage device including at least one power-type electrode pair and at least one energy-type electrode pair. The positive electrodes and the negative electrodes of the power-type electrode pairs are electrically connected in parallel respectively to form a power-type electrode pair set. The positive electrodes and the negative electrodes of the energy-type electrode pairs are electrically connected in parallel respectively to form an energy-type electrode pair set. The positive electrode terminal and the negative electrode terminal of the power-type electrode pair set and those of the energy-type electrode pair set can be disposed at the same side or at different sides of the energy storage device. The energy-type electrode pair set can be composed of the electrode material of the lead-acid battery, the nickel-metal hydride battery (Ni-MH) or the lithium ion battery. The power-type electrode pair set can be composed of the electrode material of the electric double layer electrode or the capacitance-imitating electrode. The power-type electrode pair set or the energy-type electrode pair set can be operated independently. Also, the power-type electrode pair set and the energy-type electrode pair set can be operated in parallel via an external system, which has a proper circuit design, to be connected to the charger or the discharge load circuit.

The energy storage device of the present invention further includes a temperature sensor for measuring the temperature of the energy storage device. In addition, the temperature sensor can cooperate with an electronic element to heat the energy storage device.

The energy storage device of the present invention further includes a positive temperature coefficient (PTC) thermistor. The PCT thermistor has the characteristics that when the temperature is higher than a specific temperature (or called the critical temperature), its resistance value is increased, and when the temperature is below the specific temperature, its resistance value is lower and approaches a constant. Therefore, by selecting the PCT thermistor having a proper critical temperature, whether the current to an external heating element should be cut off can be spontaneously controlled.

The active material used by the electrode of the energy-type electrode pair and that of the power-type electrode pair can be applied to different energy storage devices, e.g. the electrode of the lead-acid battery, the nickel-metal hydride battery (Ni-MH), the lithium ion battery, the electric double layer capacitor or the capacitance-imitating capacitor.

The energy-type electrode pair and the power-type electrode pair can use the same material to form an energy storage system. The respective characteristics of the energy-type electrode pair and the power-type electrode pair can be changed by changing the thickness and composition ratio of the active material of the electrode, the type of the conductive additive or the adhesive, the size and shape of the active material, and the material or thickness of the current collector so as to manufacture the electrode of the energy-type electrode pair and that of the power-type electrode pair respectively, thereby achieving the required characteristics of the energy storage device of the present invention.

The active material is the material that can perform the electrochemical redox in the energy storage device, thereby generating a potential difference. When the energy storage device is charged, the potential difference is risen. At this time, the positive electrode in the energy storage device performs the electrical oxidation, and outputs the electron to the outer loop. Then, the negative electrode receives the electron output by the positive electrode, and performs the electrical reduction. However, when the energy storage device is discharged, which is a spontaneous reaction, the potential difference is decreased. At this time, the negative electrode in the energy storage device performs the electrical oxidation, and outputs the electron to the outer loop. Then, the positive electrode receives the electron output by the negative electrode, and performs the electrical reduction.

The active material used by the electrode of the energy-type electrode pair can be different from that used by the electrode of the power-type electrode pair. For example, the active material of the electrode of the energy-type electrode pair can be applied to the electrode of the lead-acid battery, the nickel-metal hydride battery (Ni-MH) or the lithium ion battery. The active material of the electrode of the power-type electrode pair can be applied to the electrode of the electric double layer capacitor or the capacitance-imitating capacitor. Through the above-mentioned collocation, the energy-type electrode, the power-type electrode, the energy-type electrode pair and the power-type electrode pair are manufactured respectively, thereby achieving the required characteristics of the energy storage device of the present invention.

The types of the electrolyte can be selected according to the active materials of the electrodes. In addition, because the type of the active material of the electrode of the energy-type electrode pair can be identical to that of the electrode of the power-type electrode pair, the energy-type electrode pair and the power-type electrode pair can use the same electrolyte. The electrolyte can be solid, colloidal or a liquid. Ions formed after the dissociation of the electrolyte can move through the porous insulating film disposed between the positive electrode and the negative electrode in the electrode pair to serve as the medium between the positive electrode and the negative electrode.

The collocation of the electrode active material with the electrolyte is related to the type of the energy storage device. For example, in the lead-acid battery, the lead dioxide serves as the positive electrode, the lead serves as the negative electrode, and the concentrated sulfuric acid serves as the electrolyte. In the lithium ion secondary battery, usually the lithium ion transition metal oxide serves as the positive electrode, e.g. the $LiCoO_2$, $LiMn_2O_4$ or $LiFePO_4$, and the negative electrode is the graphite, artificial graphite, or tin, silicon or the combination thereof. The definitions of the positive electrode and the negative electrode are that the reduction potential of the active material of the positive electrode is higher than that of the active material of the negative electrode. Therefore, under these definitions, the positive electrode has a higher potential than that of the negative electrode.

Moreover, the respective numbers of the energy-type electrode pair and the power-type electrode pair of the present invention can be determined according to the required power capacity and output power. In addition, the energy-type electrode pair and the power-type electrode pair can be electrically connected in parallel in random order according to actual needs. Various variations of the present invention will be described in the following embodiments.

Please refer to FIG. 1, which shows an energy-type electrode pair 10 according to an embodiment of the present invention. The energy-type electrode pair 10 is composed of a positive electrode 11 and a negative electrode 12. The positive electrode 11 has an internal positive terminal 18, and the negative electrode 12 has an internal negative terminal 19. An insulating film 17 is disposed between the positive electrode 11 and the negative electrode 12. The insulating film 17 is soaked with a first electrolyte (not shown).

Figure 2:
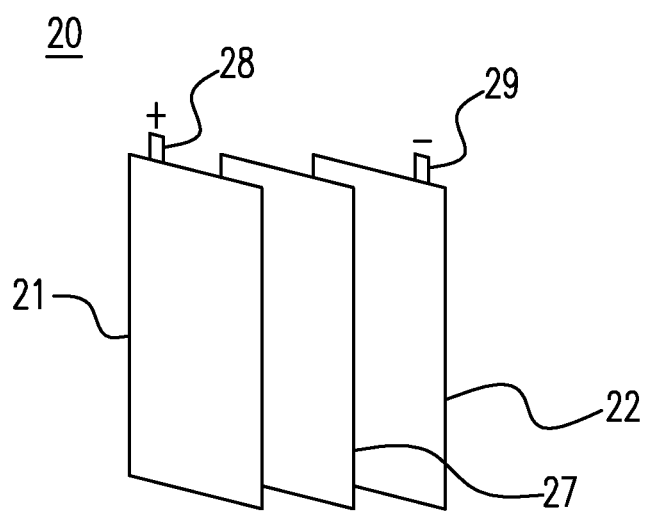
FIG. 2 shows a power-type electrode pair according to an embodiment of the present invention.

Please refer to FIG. 2, which shows a power-type electrode pair 20 according to an embodiment of the present invention. The power-type electrode pair 20 is composed of a positive electrode 21 and a negative electrode 22. The positive electrode 21 has an internal positive terminal 28, and the negative electrode 22 has an internal negative terminal 29. An insulating film 27 is disposed between the positive electrode 21 and the negative electrode 22. The insulating film 27 is soaked with a second electrolyte (not shown).

Figure 3A:
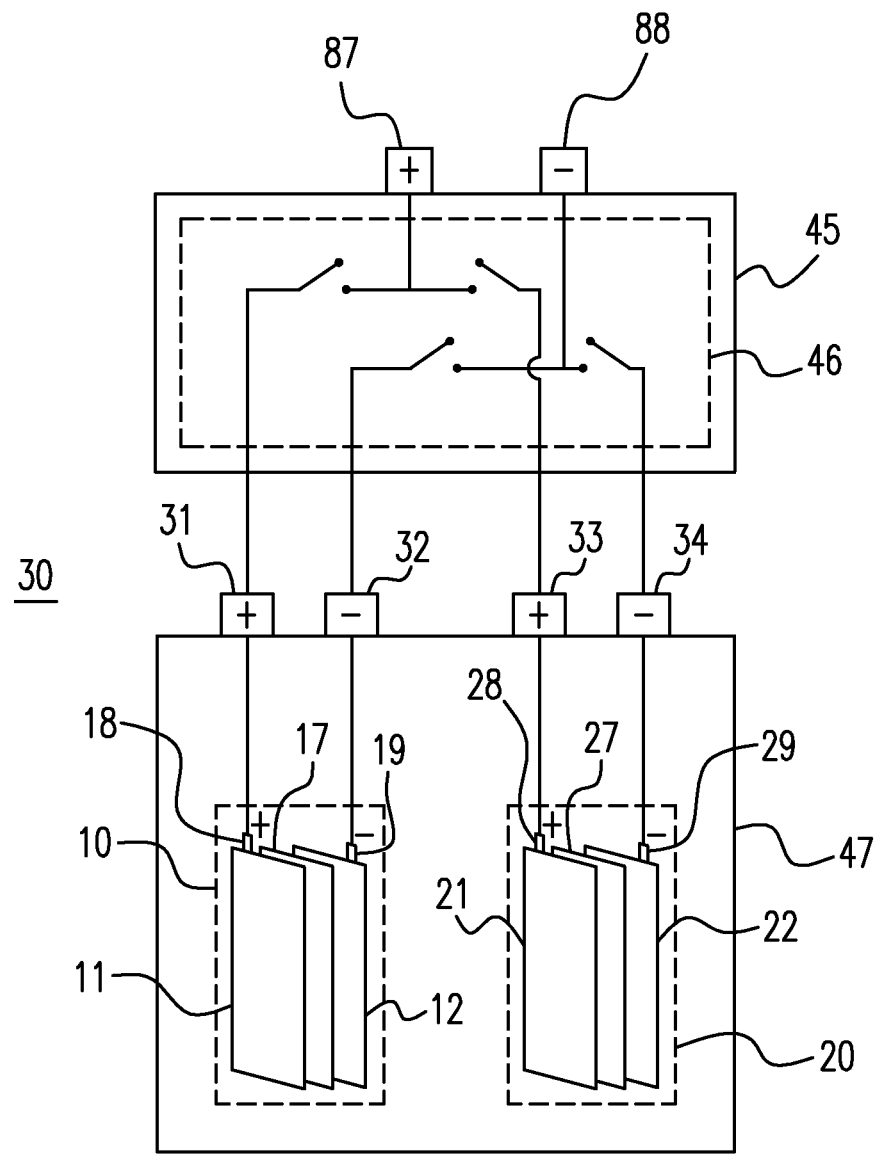
FIG. 3A shows a battery according to a first embodiment of the present invention.

Please refer to FIG. 3A, which shows a battery 30 according to a first embodiment of the present invention. As shown in FIG. 3A, the energy-type electrode pair 10 and the power-type electrode pair 20 are received in a housing 47. The housing 47 has an external positive terminal 31 connected to the internal positive terminal 18, an external negative terminal 32 connected to the internal negative terminal 19, an external positive terminal 33 connected to the internal positive terminal 28, and an external negative terminal 34 connected to the internal negative terminal 29. The external positive terminal 31 and the external negative terminal 32 are disposed at the same side of the housing 47 as that of the external positive terminal 33 and the external negative terminal 34. In addition, the first electrolyte is disposed between the positive electrode 11 and the negative electrode 12 of the energy-type electrode pair 10, and the second electrolyte is disposed between the positive electrode 21 and the negative electrode 22 of the power-type electrode pair 20, thereby forming the battery 30. The energy-type electrode pair 10 and the power-type electrode pair 20 can be operated independently. Otherwise, the external positive terminals 31, 33 and the external negative terminals 32, 34 can be electrically connected to an external positive terminal 87 and an external negative terminal 88 of the control module 45 respectively via a circuit 46 in the control module 45. The circuit 46 controls the energy-type electrode pair 10 and the power-type electrode pair 20 to be operated in parallel.

Figure 3B:
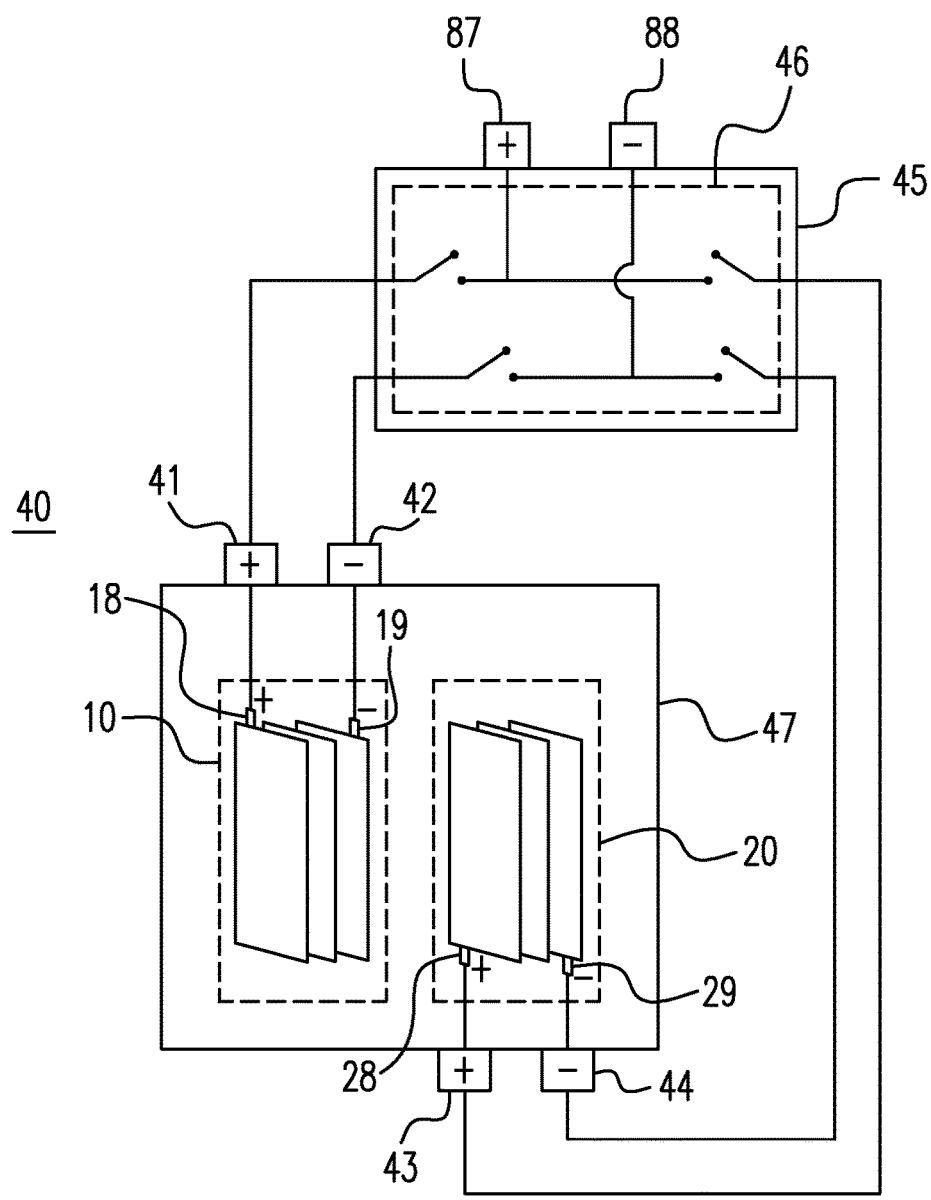
FIG. 3B shows a battery according to a second embodiment of the present invention.

Please refer to FIG. 3B, which shows a battery 40 according to a second embodiment of the present invention. As shown in FIG. 3B, the energy-type electrode pair 10 and the power-type electrode pair 20 are received in a housing 47. The housing 47 has an external positive terminal 41 connected to the internal positive terminal 18, an external negative terminal 42 connected to the internal negative terminal 19, an external positive terminal 43 connected to the internal positive terminal 28, and an external negative terminal 44 connected to the internal negative terminal 29. The external positive terminal 41 and the external negative terminal 42 are disposed at a different side of the housing 47 from that of the external positive terminal 43 and the external negative terminal 44. Similarly, the first electrolyte is disposed between the positive electrode 11 and the negative electrode 12 of the energy-type electrode pair 10, and the second electrolyte is disposed between the positive electrode 21 and the negative electrode 22 of the power-type electrode pair 20, thereby forming the battery 40. Moreover, the energy-type electrode pair 10 and the power-type electrode pair 20 can be operated independently. Otherwise, similar to FIG. 3A, the external positive terminals 41, 43 and the external negative terminals 42, 44 can be further electrically connected to the control module 45. The control module 45 controls the energy-type electrode pair 10 and the power-type electrode pair 20 to be operated in parallel.

Figure 4:
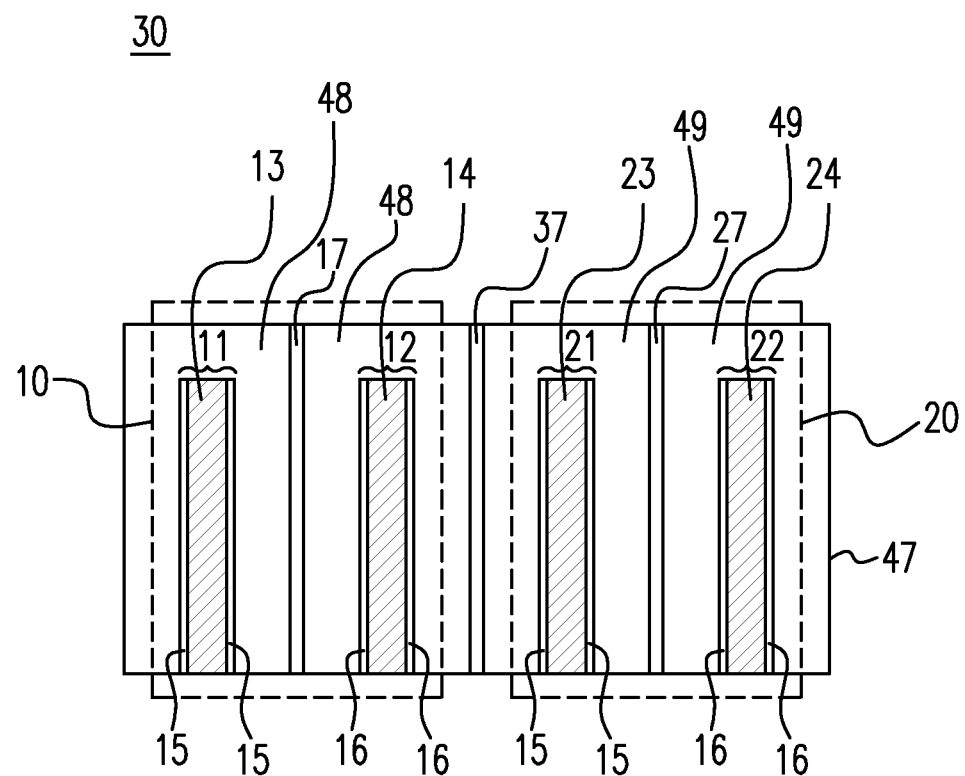
FIG. 4 shows the interior structure of the battery in FIG. 3A.

Please refer to FIG. 4, which shows the interior structure of the battery 30 in FIG. 3A. The positive electrode 11 of the energy-type electrode pair 10 includes a current collecting plate 13 and a positive electrode coating 15. The positive electrode coating 15 covers the surface of the current collecting plate 13. The negative electrode 12 of the energy-type electrode pair 10 includes a current collecting plate 14 and a negative electrode coating 16. The negative electrode coating 16 covers the surface of the current collecting plate 14. The positive electrode 21 of the power-type electrode pair 20 includes a current collecting plate 23 and a positive electrode coating 25. The positive electrode coating 25 covers the surface of the current collecting plate 23. The negative electrode 22 of the power-type electrode pair 20 includes a current collecting plate 24 and a negative electrode coating 26. The negative electrode coating 26 covers the surface of the current collecting plate 24. The insulating film 17 is disposed between the positive electrode 11 and the negative electrode 12, the insulating film 27 is disposed between the positive electrode 21 and the negative electrode 22, and an insulating film 37 is disposed between the energy-type electrode pair 10 and the power-type electrode pair 20. In this embodiment, the respective materials of the insulating film 17, the insulating film 27 and the insulating film 37 are identical. However, in other embodiments, the respective materials of the insulating film 17, the insulating film 27 and the insulating film 37 can be different. The positive electrode 11, the negative electrode 12, the positive electrode 21, the negative 22, the insulating film 17, the insulating film 17 and the insulating film 37 are all received in the housing 47. The energy-type electrode pair 10 further includes a first electrolyte 48. The positive electrode 11, the negative electrode 12 and the insulating film 17 are disposed in the first electrolyte 48. The power-type electrode pair 20 further includes a second electrolyte 49. The positive electrode 21, the negative electrode 22 and the insulating film 27 are disposed in the second electrolyte 49. The insulating films 17, 27, 37 are made of a porous material for being soaked with the first electrolyte 48 and the second electrolyte 49.

Please refer to FIGS. 3A, 3B and 4. When the battery 30 or 40 is used at a low temperature environment, the control module 45 controls the power-type electrode pair 20 to act first. The process of energy input/output (charge/discharge) is performed via the power-type electrode pair 20, the external positive terminal 43 and the external negative terminal 44. During the charge/discharge process, the power-type electrode pair 20 generates heat. The heat generated heats the power-type electrode pair 20 and the energy-type electrode pair 10. This enables the power-type electrode pair 20 and the energy-type electrode pair 10 to reach a working temperature. Under the working temperature, the battery 30 or 40 can be charged and discharged normally, thereby enhancing the performance and safety of the battery 30 or 40 for long time operation. At this time, the energy-type electrode pair 10 and the power-type electrode pair 20 can be operated independently. Otherwise, the energy-type electrode pair 10 and the power-type electrode pair 20 can be controlled by the control module 45 to be operated in parallel according to actual needs.

Figure 5:
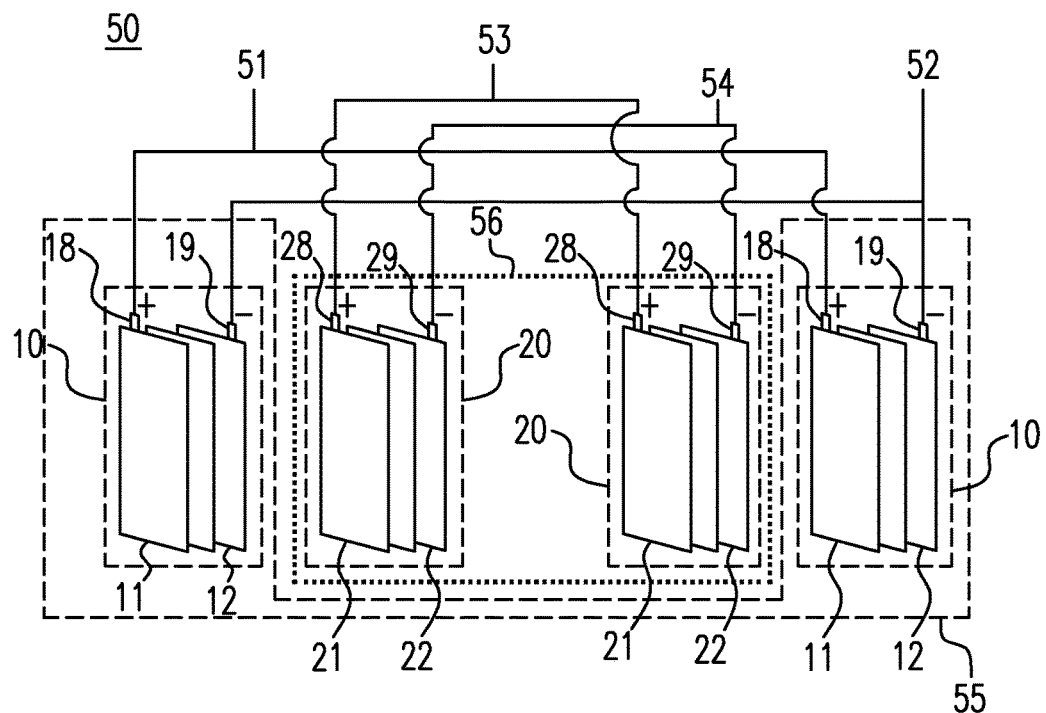
FIG. 5 shows a battery according to a third embodiment of the present invention.

Please refer to FIG. 5, which shows a battery 50 according to a third embodiment of the present invention. The battery 50 is equipped with two energy-type electrode pairs 10. Two power-type electrode pairs 20 are disposed between the two energy-type electrode pairs 10. The positive electrodes 11 of the two energy-type electrode pairs 10 are connected in parallel, and the negative electrodes 12 thereof are also connected in parallel to form an energy-type electrode pair set 55. The positive electrodes 21 of the two power-type electrode pairs 20 are connected in parallel, and the negative electrodes 22 thereof are also connected in parallel to form a power-type electrode pair set 56. The internal positive terminal 18 of the energy-type electrode pair set 55 is connected to an external positive terminal 51. The internal positive terminal 28 of the power-type electrode pair set 56 is connected to an external positive terminal 53. The internal negative terminal 19 of the energy-type electrode pair set 55 is connected to an external negative terminal 52. The internal negative terminal 29 of the power-type electrode pair set 56 is connected to an external negative terminal 54. When the battery 50 is used at a low temperature environment, the power-type electrode pair 56 acts first. The operation is performed via the external positive terminal 53 and the external negative terminal 54 of the power-type electrode pair set 56. The temperatures of the energy-type electrode pair set 55 and the power-type electrode pair set 56 are enhanced by the heat generated by the power-type electrode pair set 56, until reaching a working temperature that is suitable for operation, thereby enhancing the performance and safety of the battery 50 for long time operation. At this time, the energy-type electrode pair set 55 and the power-type electrode pair set 56 can be operated independently. Otherwise, the external positive terminals 51, 53 and the external negative terminals 52, 54 can be further electrically connected to a control module (not shown). The control module controls the energy-type electrode pair set 55 and the power-type electrode pair set 56 to be operated in parallel.

Figure 6:
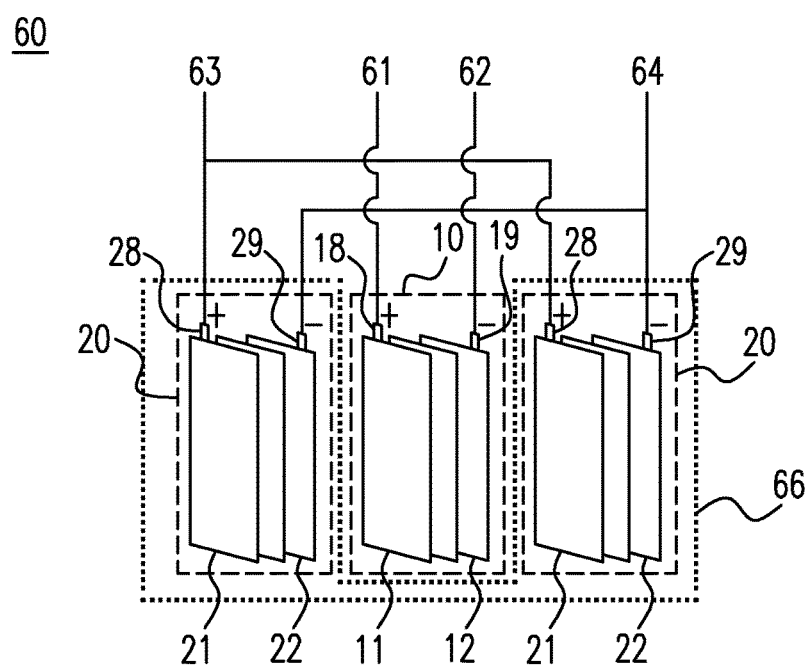
FIG. 6 shows a battery according to a fourth embodiment of the present invention.

Please refer to FIG. 6, which shows a battery 60 according to a fourth embodiment of the present invention. The battery 60 is equipped with two power-type electrode pairs 20, and an energy-type electrode pair 10 is disposed between the two power-type electrode pairs 20. The positive electrodes 21 of the two power-type electrode pairs 20 are connected in parallel, and the negative electrodes 22 thereof are also connected in parallel to form a power-type electrode pair set 66. Moreover, all internal positive terminals 28 of the power-type electrode pair set 66 are connected to an external positive terminal 63, and all internal negative terminals 29 thereof are connected to an external negative terminal 64. In addition, the internal positive terminal 18 of the energy-type electrode pair 10 is connected to an external positive terminal 61. The internal negative terminal 19 of the energy-type electrode pair 10 is connected to an external negative terminal 62. When the battery 60 is used at a low temperature environment, the power-type electrode pair set 66 acts first. The operation is performed via the external positive terminal 63 and the external negative terminal 64 of the power-type electrode pair set 66. The temperatures of the energy-type electrode pair 10 and the power-type electrode pair set 66 are enhanced by the heat generated by the power-type electrode pair set 66, until reaching a working temperature that is suitable for operation, thereby enhancing the performance and safety of the battery 60 for long time operation. At this time, the energy-type electrode pair 10 and the power-type electrode pair set 66 can be operated independently. Otherwise, the external positive terminals 61, 63 and the external negative terminals 62, 64 can be further electrically connected to a control module (not shown). The control module controls the energy-type electrode pair 10 and the power-type electrode pair set 66 to be operated in parallel.

Figure 7:
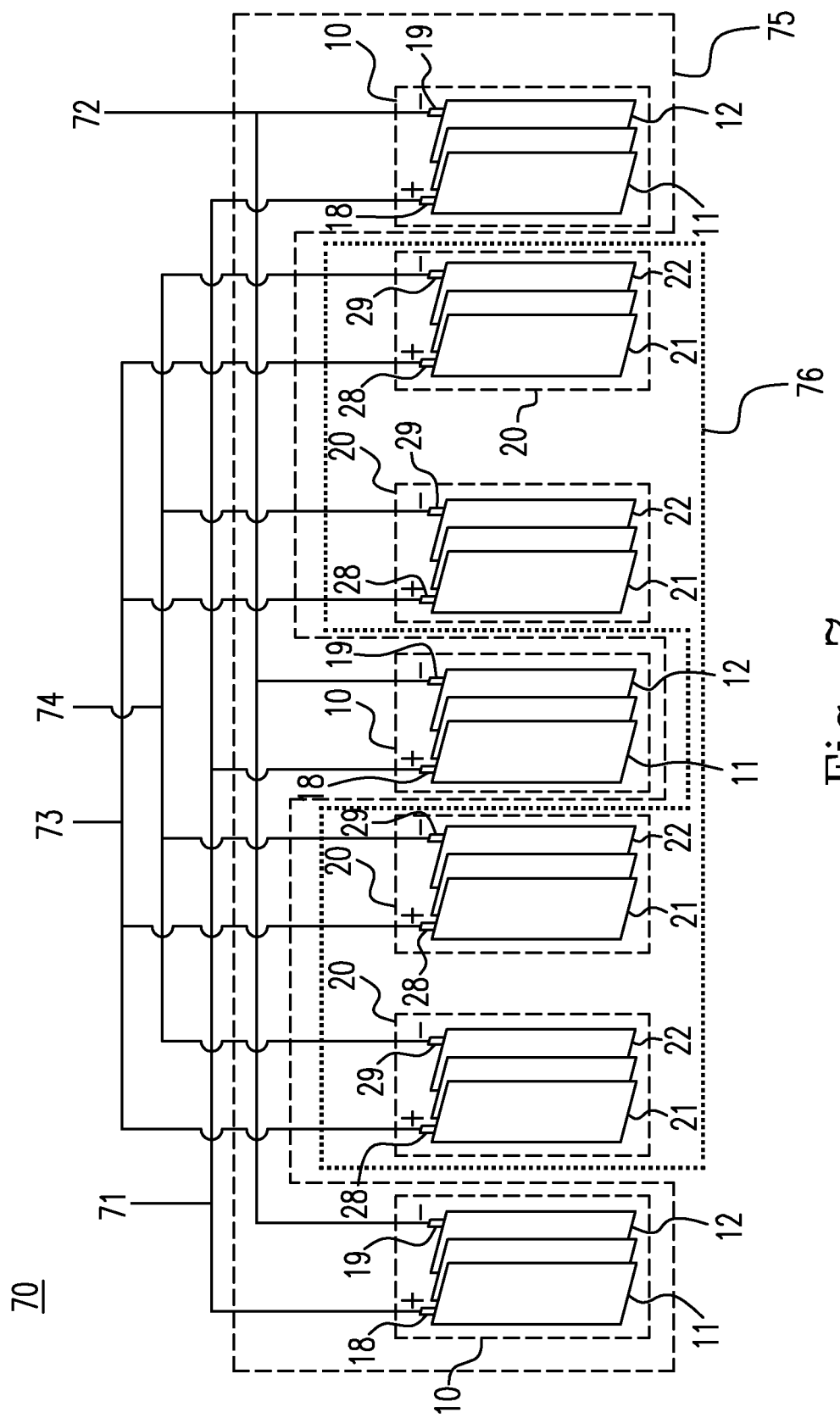
FIG. 7 shows a battery according to a fifth embodiment of the present invention.

Please refer to FIG. 7, which shows a battery 70 according to a fifth embodiment of the present invention. The battery 70 is sequentially equipped with an energy-type electrode pair 10, two power-type electrode pairs 20, an energy-type electrode pair 10, two power-type electrode pairs 20 and an energy-type electrode pair 10. The positive electrodes 11 of the energy-type electrode pairs 10 are connected in parallel, and the negative electrodes 12 thereof are also connected in parallel to form an energy-type electrode pair set 75. The positive electrodes 21 of the power-type electrode pairs 20 are connected in parallel, and the negative electrodes 22 thereof are also connected in parallel to form a power-type electrode pair set 76. Moreover, all internal positive terminals 18 of the energy-type electrode pair set 75 are connected to an external positive terminal 71, and all internal negative terminals 19 thereof are connected to an external negative terminal 72. All internal positive terminals 28 of the power-type electrode pair set 76 are connected to an external positive terminal 73, and all internal negative terminals 29 thereof are connected to an external negative terminal 74. When the battery 70 is used at a low temperature environment, the power-type electrode pair set 76 acts first. The operation is performed via the external positive terminal 73 and the external negative terminal 74 of the power-type electrode pair set 76. The temperatures of the energy-type electrode pair set 75 and the power-type electrode pair set 76 are enhanced by the heat generated by the power-type electrode pair set 76, until reaching a working temperature that is suitable for operation, thereby enhancing the performance and safety of the battery 70 for long time operation. At this time, the energy-type electrode pair set 75 and the power-type electrode pair set 76 can be operated independently. Otherwise, the external positive terminals 71, 73 and the external negative terminals 72, 74 can be further electrically connected to a control module (not shown). The control module controls the energy-type electrode pair set 75 and the power-type electrode pair set 76 to be operated in parallel or independently.

Figure 8:
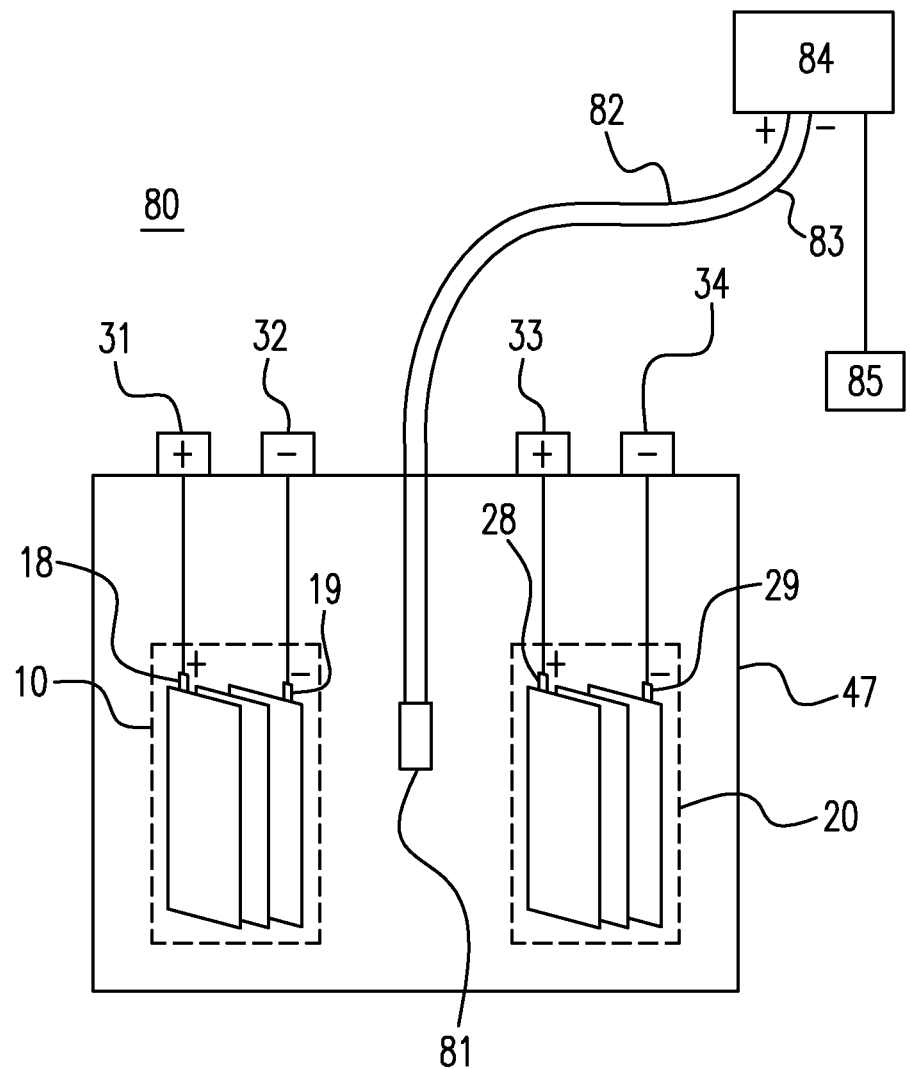
FIG. 8 shows a battery according to a sixth embodiment of the present invention.

Please refer to FIG. 8, which shows a battery 80 according to a sixth embodiment of the present invention. As shown in FIG. 8, a temperature sensing element 81 is disposed in the battery 80. The temperature sensing element 81 has a positive electrode signal line 82 and a negative electrode signal line 83 for sending a signal, which indicates the interior temperature of the battery 80, to a controller 84 so that the controller can determine whether to heat the battery 80 or not via an external heating element 85. At this time, the energy-type electrode pair 10 and the power-type electrode pair 20 can be operated independently. Otherwise, the external positive terminals 31, 33 and the external negative terminals 32, 34 can be further electrically connected to a control module (not shown). The control module controls the energy-type electrode pair 10 and the power-type electrode pair 20 to be operated in parallel or independently.

Figure 9:
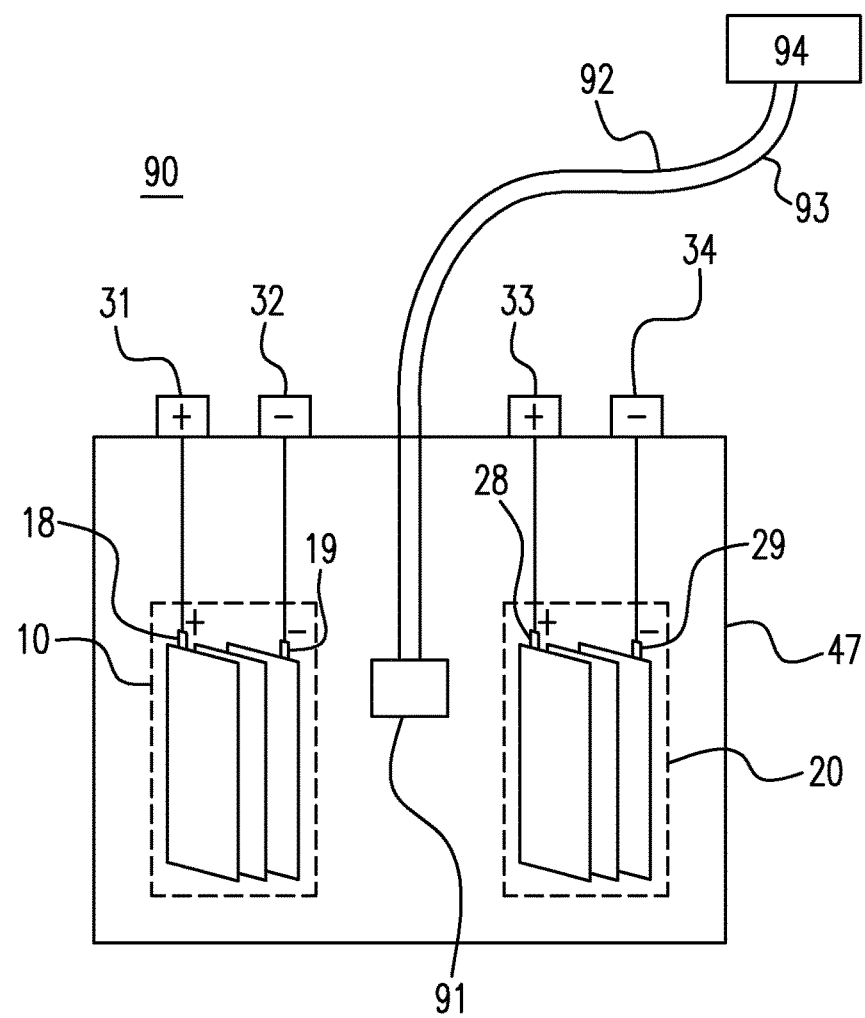
FIG. 9 shows a battery according to a seventh embodiment of the present invention.
Figure 10:
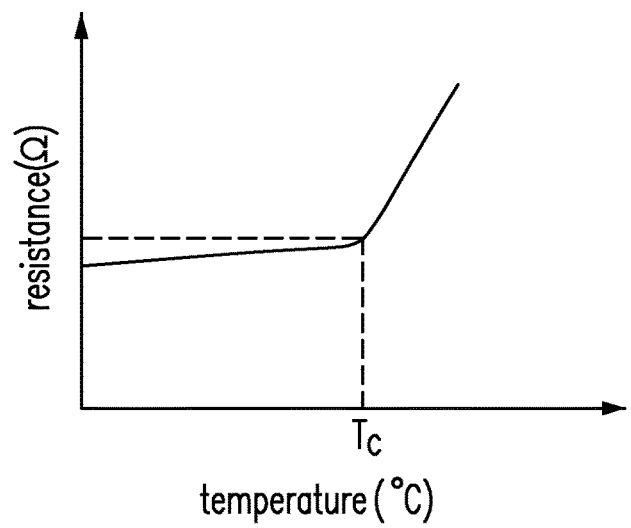
FIG. 10 shows the relationship between the resistance of the positive temperature coefficient thermistor and the temperature.

Please refer to FIGS. 9 and 10. FIG. 9 shows a battery 90 according to a seventh embodiment of the present invention, and FIG. 10 shows the relationship between the resistance of the positive temperature coefficient thermistor 91 and the temperature. As shown in FIG. 9, the battery 90 includes the positive temperature coefficient thermistor 91, a power supply 94 and power cords 92, 93. The relationship between the resistance of the positive temperature coefficient thermistor 91 and the temperature is shown in FIG. 10. When the temperature drops below a critical temperature $T_c$, the resistance value of the positive temperature coefficient thermistor 91 is lower and approaches a constant so that the positive temperature coefficient thermistor 91 turns into a conductor for the current to pass therethrough. In addition, because the current passes through the positive temperature coefficient thermistor 91, the temperature thereof is risen so that the positive temperature coefficient thermistor 91 can serve as a heater. On the contrary, when the temperature is risen above the critical temperature $T_c$, the resistance value of the positive temperature coefficient thermistor 91 is risen abruptly and greatly. Therefore, the positive temperature coefficient thermistor 91 turns into a nonconductor so that the current cannot pass therethrough. Thus, the positive temperature coefficient thermistor 91 does not heat. The critical temperature $T_c$ can be selected to be between −30° C. and 25° C. Accordingly, the proper positive temperature coefficient thermistor 91 can be selected, e.g. selecting the positive temperature coefficient thermistor 91 having a critical temperature $T_c$ of 25° C. Therefore, when the temperature of the environment is below 25° C., the current can pass through the positive temperature coefficient thermistor 91. This causes the positive temperature coefficient thermistor 91 to heat the energy-type electrode pair 10 and the power-type electrode pair 20. However, when the temperature of the environment is above 25° C., the current cannot pass through the positive temperature coefficient thermistor 91. This causes the positive temperature coefficient thermistor 91 to stop heating the energy-type electrode pair 10 and the power-type electrode pair 20. At this time, the energy-type electrode pair 10 and the power-type electrode pair 20 can be operated independently. Otherwise, the external positive terminals 31, 33 and the external negative terminals 32, 34 can be further electrically connected to a control module (not shown). The control module controls the energy-type electrode pair 10 and the power-type electrode pair 20 to be operated in parallel.

Embodiments

1. An energy storage device, comprising at least an energy-type electrode pair, including a first positive electrode; a first negative electrode disposed opposite to the first positive electrode; and a first electrolyte disposed between the first positive electrode and the first negative electrode; at least a power-type electrode pair, including a second positive electrode; a second negative electrode disposed opposite to the second positive electrode; and a second electrolyte disposed between the second positive electrode and the second negative electrode; and a housing receiving the energy-type electrode pair and the power-type electrode pair.
2. The energy storage device of Embodiment 1, further comprising a control module controlling the energy-type electrode pair and the power-type electrode pair to be operated independently.
3. The energy storage device of any one of Embodiments 1-2, further comprising a control module controlling the energy-type electrode pair and the power-type electrode pair to be operated in parallel via a circuit.
4. The energy storage device of any one of Embodiments 1-3, further comprising an electronic element in thermal contact with the energy-type electrode pair.
5. The energy storage device of any one of Embodiments 1-4, wherein the electronic element is a positive temperature coefficient (PTC) resistor.
6. The energy storage device of any one of Embodiments 1-5, wherein the energy-type electrode pair has an energy density higher than that of the power-type electrode pair.
7. The energy storage device of any one of Embodiments 1-6, wherein the energy-type electrode pair has a power density lower than that of the power-type electrode pair.
8. The energy storage device of any one of Embodiments 1-7, wherein when the energy-type electrode pair has a temperature not lower than a working temperature of the energy-type electrode pair, and the energy storage device needs to input/output a high energy electricity, the energy-type electrode pair performs a charge/discharge.
9. The energy storage device of any one of Embodiments 1-8, wherein when the energy-type electrode pair has a temperature lower than a working temperature of the energy-type electrode pair, the power-type electrode pair performs a charge/discharge.
10. The energy storage device of any one of Embodiments 1-9, wherein when the energy storage device needs to input/output a high power electricity, the power-type electrode pair performs a charge/discharge.
11. The energy storage device of any one of Embodiments 1-10, wherein the housing has a first positive electrode terminal electrically connected to the first positive electrode, a first negative electrode terminal electrically connected to the first negative electrode, a second positive electrode terminal electrically connected to the second positive electrode, and a second negative electrode terminal electrically connected to the second negative electrode.
12. The energy storage device of any one of Embodiments 1-11, wherein:
the first positive electrode terminal and the first negative electrode terminal are disposed at a first side of the housing; and
the second positive electrode terminal and the second negative electrode terminal are disposed at a second side of the housing.
13. The energy storage device of any one of Embodiments 1-12, wherein the first side and the second side are one of the same side of the housing and different sides of the housing.
14. The energy storage device of any one of Embodiments 1-13, further comprising:
a first insulating film disposed between the first positive electrode and the first negative electrode; and
a second insulating film disposed between the second positive electrode and the second negative electrode.
15. An energy storage device, comprising at least an energy-type electrode pair; at least a power-type electrode pair in thermal contact with the energy-type electrode pair; and a control module controlling the energy-type electrode pair and the power-type electrode pair to be operated independently or in parallel via a circuit.
16. The energy storage device of Embodiment 15, wherein the power-type electrode pair serves as a heater.
17. An energy storage device, comprising an electrode pair; and a positive temperature coefficient thermistor in thermal contact with the electrode pair, having a first positive temperature coefficient under a specific temperature, and having a second positive temperature coefficient above the specific temperature, wherein the first positive temperature coefficient is smaller than the second positive temperature coefficient.

18. The energy storage device of Embodiment 17, wherein the specific temperature is between −30° C. and 25° C.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An energy storage device, comprising:
   at least an energy-type electrode pair, including:
     a first positive electrode;
     a first negative electrode disposed opposite to the first positive electrode; and
     a first electrolyte disposed between the first positive electrode and the first negative electrode;
   a circuit coupled to the at least an energy-type electrode pair;
   at least a power-type electrode pair coupled to the circuit, and including:
     a second positive electrode;
     a second negative electrode disposed opposite to the second positive electrode; and
     a second electrolyte disposed between the second positive electrode and the second negative electrode; and
   a housing receiving the at least an energy-type electrode pair and the at least a power-type electrode pair,
     wherein the at least an energy-type electrode pair and the at least a power-type electrode pair are simultaneously operated in parallel via the circuit, the circuit has a positive temperature coefficient thermistor in thermal contact with the at least an energy-type electrode pair and the at least a power-type electrode pair, the positive temperature coefficient thermistor has a first positive temperature coefficient below a specific temperature and has a second positive temperature coefficient above the specific temperature, and the first positive temperature coefficient is smaller than the second positive temperature coefficient.

2. The energy storage device as claimed in claim 1, further comprising a control module controlling the energy-type electrode pair and the power-type electrode pair to be operated independently.

3. The energy storage device as claimed in claim 1, further comprising a control module controlling the energy-type electrode pair and the power-type electrode pair to be operated in parallel via a circuit.

4. The energy storage device as claimed in claim 1, further comprising an electronic element in thermal contact with the energy-type electrode pair.

5. The energy storage device as claimed in claim 4, wherein the electronic element is a positive temperature coefficient (PTC) resistor.

6. The energy storage device as claimed in claim 1, wherein the energy-type electrode pair has an energy density higher than that of the power-type electrode pair.

7. The energy storage device as claimed in claim 1, wherein the energy-type electrode pair has a power density lower than that of the power-type electrode pair.

8. The energy storage device as claimed in claim 1, wherein when the energy-type electrode pair has a temperature not lower than a working temperature of the energy-type electrode pair, and the energy storage device needs to input/output a high energy electricity, the energy-type electrode pair performs a charge/discharge.

9. The energy storage device as claimed in claim 1, wherein when the energy-type electrode pair has a temperature lower than a working temperature of the energy-type electrode pair, the power-type electrode pair performs a charge/discharge.

10. The energy storage device as claimed in claim 1, wherein when the energy storage device needs to input/output a high power electricity, the power-type electrode pair performs a charge/discharge.

11. The energy storage device as claimed in claim 1, wherein the housing has a first positive electrode terminal electrically connected to the first positive electrode, a first negative electrode terminal electrically connected to the first negative electrode, a second positive electrode terminal electrically connected to the second positive electrode, and a second negative electrode terminal electrically connected to the second negative electrode.

12. The energy storage device as claimed in claim 11, wherein:
   the first positive electrode terminal and the first negative electrode terminal are disposed at a first side of the housing; and
   the second positive electrode terminal and the second negative electrode terminal are disposed at a second side of the housing.

13. The energy storage device as claimed in claim 12, wherein the first side and the second side are one of the same side of the housing and different sides of the housing.

14. The energy storage device as claimed in claim 1, further comprising:
   a first insulating film disposed between the first positive electrode and the first negative electrode; and
   a second insulating film disposed between the second positive electrode and the second negative electrode.

* * * * *